(12) United States Patent
Salsbery et al.

(10) Patent No.: US 8,320,898 B2
(45) Date of Patent: Nov. 27, 2012

(54) SYSTEMS AND METHODS FOR OPTIMIZING THE CONFIGURATION OF A SET OF PERFORMANCE SCALING ALGORITHMS

(75) Inventors: Brian J. Salsbery, Boulder, CO (US); Norman S. Gargash, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 12/883,449

(22) Filed: Sep. 16, 2010

(65) Prior Publication Data
US 2012/0071216 A1   Mar. 22, 2012

(51) Int. Cl.
H04M 3/00 (2006.01)
H04M 1/00 (2006.01)
G06F 1/00 (2006.01)

(52) U.S. Cl. ............ 455/418; 455/550.1; 455/574; 713/300; 713/323

(58) Field of Classification Search ............ 713/300, 713/323; 455/574
See application file for complete search history.

(56) References Cited

U.S. PATENT DOCUMENTS

| | | | |
|---|---|---|---|
| 6,711,447 B1 | 3/2004 | Saeed | |
| 7,111,179 B1 * | 9/2006 | Girson et al. | 713/300 |
| 7,706,844 B2 | 4/2010 | Ranta | |
| 7,730,340 B2 * | 6/2010 | Hu et al. | 713/323 |
| 2004/0139302 A1 | 7/2004 | Flautner et al. | |
| 2004/0153867 A1 * | 8/2004 | McAlinden et al. | 714/47 |
| 2005/0097228 A1 * | 5/2005 | Flautner et al. | 710/1 |
| 2005/0132238 A1 * | 6/2005 | Nanja | 713/300 |
| 2007/0245163 A1 | 10/2007 | Lu et al. | |
| 2008/0209243 A1 * | 8/2008 | Ghiasi et al. | 713/320 |
| 2008/0301474 A1 | 12/2008 | Bussa et al. | |
| 2010/0134305 A1 | 6/2010 | Lu et al. | |
| 2010/0162256 A1 | 6/2010 | Branover et al. | |

OTHER PUBLICATIONS

Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.
International Search Report and Written Opinion—PCT/US2011/043292—ISA/EPO—Oct. 10, 2011.
Sebastian Herbert et al: "Variation-aware dynamic voltage/frequency scaling", High Performance Computer Architecture, 2009. HPCA 2009. IEEE 15th International Symposium on, IEEE, Piscataway, NJ, USA, Feb. 14, 2009, pp. 301-312, XP031435388, ISBN: 978-1-4244-2932-5 paragraphs [0001]-[0007].

* cited by examiner

*Primary Examiner* — Meless N Zewdu
*Assistant Examiner* — William Nealon
(74) *Attorney, Agent, or Firm* — Nicholas A. Cole

(57) ABSTRACT

Systems and methods for optimizing performance scaling algorithms designated for operation on a mobile device are disclosed. A system memory includes program, use case, and results stores in addition to test logic. The program store contains a set of programs defined by the combination of a performance scaling algorithm and a set of parameters. The use case store contains information that identifies expected tasks to be performed by end users of the mobile device over time. The results store organizes a respective merit value determined after each of the set of programs has been executed for tasks defined by each use case. When executed, the test logic adjusts the mobile device and associates a select program for each of the use cases in response to the stored merit values. The merit values are determined as a function of a performance metric and a power metric.

22 Claims, 8 Drawing Sheets

600

| TASK | USAGE |
|---|---|
| WEB BROWSING | 5% |
| A/V PLAYBACK | 5% |
| AUDIO PLAYBACK | 6% |
| EMAIL APP. | 12% |
| OTHER APP(s). | 5% |
| IDLE | 67% |

610

FIGURES OF MERIT OR MERIT VALUES

| A | B | | N |
|---|---|---|---|
| 72 | 86 | | 25 |
| 73 | 86 | | 13 |
| 87 | 86 | ... | 21 |
| 99 | 86 | | 36 |
| 96 | 86 | | 75 |
| $(P_1, P_2)$ | | | $(P_1, P_2)$ |
| $(P_1, P_3, P_5)$ | | | |

SYSTEMS AND METHODS FOR OPTIMIZING THE CONFIGURATION OF A SET OF PERFORMANCE SCALING ALGORITHMS

DESCRIPTION OF THE RELATED ART

Technological advances in wireless communication protocols, energy storage density, processor performance and efficiency, and an increase in the density of cellular transmitters enabled the introduction of wireless digital networks in the 1990s. As use of second generation mobile devices became more widespread it became clear that the demand for data services which include access to the Internet was growing. The introduction of packet-switching rather than circuit-switching for data transmission with third generation wireless communication systems enabled the increases in data transmission rates required to deliver streaming media to a mobile device.

Today's data network capable mobile devices include high-performance processors to provide a plethora of applications to the end user. However, the demand for performance results in a corresponding increase in power consumption. The power dissipation in modern processors is rapidly increasing as both clock frequency and the number of transistors required for a given implementation increase. Unfortunately, battery technology has not kept pace with the energy requirements of these data network capable wireless devices, which leads to a design trade-off between application performance and battery life. Even when it is determined that battery life can be sacrificed for full performance, heat management may become problematic for both the battery and the electronic circuits within the often hand-sized housings.

The demand for processors that provide high performance and low power consumption has led to the use of dynamic voltage and frequency scaling (DVFS) in processor designs. DVFS enables trade-offs between power consumption and performance. Processors designed to take advantage of DVFS allow the clock frequency of the processor to be adjusted with a corresponding adjustment in voltage. Reducing clock frequency alone is not useful, since any power savings is offset by an increase in execution time, resulting in no net reduction in the total energy consumed. However, a reduction in operating voltage results in a proportional savings in power consumed.

The central issue for DVFS enabled processors is how to control the balance between performance and power savings. A conventional DVFS control algorithm uses a measure of idle time to identify a modified performance level that permits a projected workload to be stretched in time to a deadline. That is, idle time is reduced by operating the processor at a lower voltage and slower clock frequency. While this approach may be appropriate for a continuous and known workload, many mobile device applications are interactive and/or place irregular or unpredictable demands on the processor. Thus, it is apparent that no one algorithm is optimal for all mobile device applications, application combinations and uses.

SUMMARY OF THE DISCLOSURE

A method for optimizing the configuration of a set of performance scaling algorithms operative on a mobile device includes the steps of defining a set of performance scaling algorithms suitable for execution on the mobile device, identifying a set of parameters appropriate for each of the respective members of the set of performance scaling algorithms, associating the set of parameters with the respective member of the set of performance scaling algorithms to define a set of programs, identifying a first use case responsive to a set of tasks to be performed on the mobile device, applying the set of programs to the first use case to generate a merit value as a function of a performance metric and a power metric and identifying a maximum merit value for the first use case.

In an alternative embodiment of the method for optimizing the configuration of a set of performance scaling algorithms, the method further includes the step of selecting a first program from the set of programs to execute for the use case as a function of the maximum merit value.

In some example embodiments, the method for optimizing the configuration of a set of performance scaling algorithms is implemented on one of a cellular telephone, a pager, a personal digital assistant, a reader, a satellite phone, a navigation device, or a computing device with a wireless connection.

In an alternative embodiment of the method for optimizing the configuration of a set of performance scaling algorithms, the method further includes the steps of identifying a subsequent use case different from the first use case and repeating the steps of applying the set of programs and identifying the maximum merit value for the respective use cases.

In still another alternative embodiment of the immediately preceding method for optimizing the configuration of a set of performance scaling algorithms, the method further includes the steps of storing an indication of a member of the set of programs responsible for the maximum merit value for each use case to generate a performance scaling schedule and storing the performance scaling schedule on the mobile device.

In another alternative embodiment of the immediately preceding method for optimizing the configuration of a set of performance scaling algorithms, the method further includes the steps of detecting when a particular use case is active on the mobile device and selectively applying a combination of a performance scaling algorithm and a set of parameters on the mobile device.

According to another aspect, a system for identifying an optimal configuration for a set of performance scaling algorithms designated for execution on a mobile device is disclosed. The system includes a processor communicatively coupled to a non-volatile memory. The non-volatile memory has stored therein a program store containing a set of programs defined by a respective combination of a performance scaling algorithm and a set of parameters, a use case store containing a set of use cases responsive to a set of tasks to be performed on the mobile device and a results store containing a respective merit value generated after applying each member of the set of programs on the mobile device for each of the members of the set of use cases.

In an example embodiment of the system for identifying an optimal configuration for a set of performance scaling algorithms designated for execution on a mobile device, the set of use cases stored in the use case store are defined by a seller of the mobile device.

In an alternative embodiment of the system for identifying an optimal configuration for a set of performance scaling algorithms designated for execution on a mobile device, the merit value is a function of a performance metric and a power metric.

In still another alternative embodiment of the system for identifying an optimal configuration for a set of performance scaling algorithms designated for execution on a mobile device, the system further includes logic configured to associate a select member of the set of programs for the set of use cases in the use case store.

Moreover, a system that identifies an optimal configuration for a set of performance scaling algorithms operative on a mobile device includes mechanisms for storing a set of programs defined by a respective combination of a performance scaling algorithm and a set of parameters, mechanisms for controlling operation of the mobile device, the mechanisms applying a set of use cases including a set of tasks to be performed on the mobile device, mechanisms for determining a performance metric and a power metric responsive to operation of the set of programs over the set of use cases, mechanisms for generating a merit value as a function of the performance metric and the power metric, mechanisms for identifying and associating a select program with a respective use case to generate a performance scaling schedule and mechanisms for communicating the performance scaling schedule to the mobile device.

In an example embodiment, the system that identifies an optimal configuration for a set of performance scaling algorithms operative on a mobile device includes a set of use cases that identify anticipated tasks to be performed on the mobile device as a percentage of time.

In another embodiment, the system that identifies an optimal configuration for a set of performance scaling algorithms operative on a mobile device includes a merit value that is generated as the product of the performance metric and the power metric.

In still another aspect, a computer program product is disclosed that includes a computer-usable medium having a computer-readable program code embodied therein. The computer-readable program code adapted to execute and to implement a method for optimizing the configuration of a set of performance scaling algorithms operative on a mobile device. The computer program product includes logic configured to define a set of performance scaling algorithms suitable for execution on the mobile device, logic configured to identify a set of parameters appropriate for each of the respective members of the set of performance scaling algorithms, logic configured to adjust a mobile device under test to operate using a select combination of a performance scaling algorithm and a select set of parameters, the logic configured to further adjust the mobile device under test in accordance with a use case, logic configured to determine a performance metric and a power metric responsive to operation of the mobile device under test, logic configured to generate a merit value as a function of the performance metric and the power metric, logic configured to identify and associate a respective combination of a performance scaling algorithm and a respective set of parameters responsible for generating a maximum merit value to generate a point on a performance scaling schedule and logic configured to communicate the performance scaling schedule to the mobile device.

In an alternative embodiment, the computer program product adapted to execute and to implement a method for optimizing the configuration of a set of performance scaling algorithms operative on a mobile device, further includes logic configured to determine when additional test cases exist, the test cases defined by a combination of a respective performance scaling algorithm, a respective set of parameters, and a respective use case, the logic further configured to repetitively adjust the mobile device under test, determine the performance metric and the power metric, and generate a respective merit value.

In an alternative embodiment, the computer program product adapted to execute and to implement a method for optimizing the configuration of a set of performance scaling algorithms operative on a mobile device, includes a load-balancing algorithm suitable for controlling the execution of multiple processor cores.

In another alternative embodiment, the computer program product adapted to execute and to implement a method for optimizing the configuration of a set of performance scaling algorithms operative on a mobile device, includes a set of use cases that identify anticipated tasks to be performed on the mobile device as a percentage of time.

In still another alternative embodiment, the computer program product adapted to execute and to implement a method for optimizing the configuration of a set of performance scaling algorithms operative on a mobile device, includes a merit value that is calculated from the product of the performance metric and the power metric.

In still another aspect, a method for optimizing the configuration of a set of performance scaling algorithms operative on a mobile device is disclosed. The method includes the steps of storing a set of performance scaling algorithms suitable for execution on the mobile device, associating a set of parameters appropriate for each of the respective members of the set of performance scaling algorithms with the respective member of the set of performance scaling algorithms to define a set of programs, identifying a set of use cases responsive to tasks to be performed on the mobile device, storing an indication of a member of the set of programs responsible for the maximum merit value for each use case to generate a performance scaling schedule, storing the performance scaling schedule on the mobile device, detecting when a particular use case is active on the mobile device and selectively applying a combination of performance scaling algorithm and the set of parameters on the mobile device.

In some example embodiments, the method for optimizing the configuration of a set of performance scaling algorithms is operative on one of a cellular telephone, a pager, a personal digital assistant, a reader, a satellite phone, a navigation device, or a computing device.

BRIEF DESCRIPTION OF THE DRAWINGS

The systems and methods for optimizing the configuration of a set of performance scaling algorithms suitable for operating on a mobile device can be better understood with reference to the following figures. The components within the figures are not necessarily to scale, emphasis instead being placed upon clearly illustrating the principles of qualitatively measuring results generated from a set of programs including the performance scaling algorithms and respective run-time parameters. Moreover, in the figures, like reference numerals designate corresponding parts throughout the different views.

DETAILED DESCRIPTION

Figure 1:
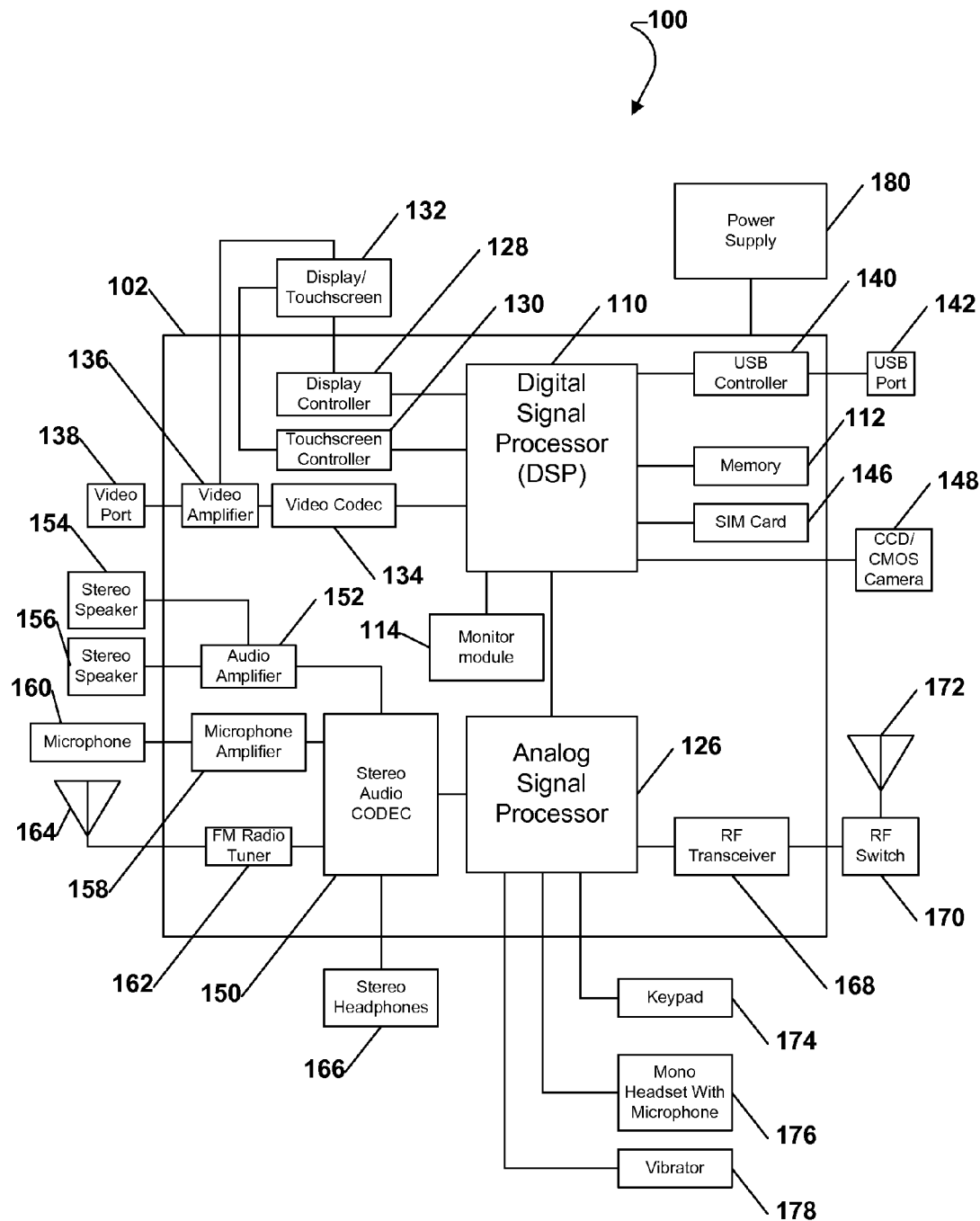
FIG. 1 is a schematic diagram illustrating an embodiment of a mobile device.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, the term "mobile device" is used to describe any device operating on a limited capacity power supply, such as a battery. Although battery operated mobile devices have been in use for decades, technological advances in rechargeable batteries coupled with the advent of third generation ("3G") wireless technology, have enabled numerous mobile devices with multiple capabilities. Therefore, a mobile device could be a cellular telephone, a satellite telephone, a pager, a PDA, a smartphone, a navigation device, a smartbook or reader, a media player, a combination of the aforementioned devices, a laptop computer with a wireless connection, among others.

The introduction of multiple-core processors and dedicated hardware resources for implementing various functions on a mobile device and a continuing desire for improvement in battery life has further complicated the task of dynamically adjusting a mobile device to reduce power consumption while providing an acceptable end-user experience. In response, an improved mobile device and methods for managing and exposing multiple performance scaling algorithms are disclosed. The number of different mobile devices available, the various communication protocols or standards used to communicate with the devices, the different types of applications available, the different ways that the devices are used, etc., make it clear that no single approach or solution can be adjusted or optimized for all possible operational combinations.

In response, it is proposed to provide and implement a set of performance scaling algorithms on a mobile device. The availability of the set of performance scaling algorithms provides power saving opportunities while minimizing performance impact when select performance scaling algorithms are correctly applied. It is further proposed to expose the set of performance scaling algorithms to the manufacturers of the various mobile devices. It is believed that the manufacturers will be interested in providing select or optimized performance scaling solutions on mobile devices based on desired performance for various use conditions. These manufacturer select or optimized solutions can be applied at startup. In some situations, manufacturers may be willing to expose performance scaling alternatives to their customers via the respective mobile devices. In these situations, the manufacturer can provide or modify an application programming interface that would enable an end user to select a desired performance and battery life that can be applied at startup or can provide for a run time selection and replacement of a performance scaling solution in real time. These alternative run time solutions could include a complete disabling of all performance scaling solutions on the mobile device.

The methods for managing and exposing performance scaling algorithms on a mobile device are generally implemented via a combination of software or firmware and hardware. The software and firmware can be stored in a non-volatile memory element coupled to one or more processors operable on the mobile device. The software stored in the non-volatile memory element is communicated to and executed by a suitable instruction execution system (microprocessor). A hardware implementation on a mobile device can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

Referring to FIG. 1, this figure is a diagram of an exemplary, non-limiting aspect of a mobile device 100 in the form of a wireless telephone. As shown, the mobile device 100 includes an on-chip system 102 that includes a digital signal processor 110 and an analog signal processor 126 that are coupled together. As illustrated in FIG. 1, a display controller 128 and a touchscreen controller 130 are coupled to the digital signal processor 110. A touchscreen display 132 external to the on-chip system 102 is coupled to the display controller 128 and the touchscreen controller 130.

FIG. 1 further indicates that a video encoder 134, e.g., a phase-alternating line ("PAL") encoder, a sequential couleur avec memoire ("SECAM") encoder, a national television system(s) committee ("NTSC") encoder or any other video encoder, is coupled to the digital signal processor 110. Further, a video amplifier 136 is coupled to the video encoder 134 and the touchscreen display 132. A video port 138 is coupled to the video amplifier 136. As depicted in FIG. 1, a universal serial bus ("USB") controller 140 is coupled to the digital signal processor 110. Also, a USB port 142 is coupled to the USB controller 140. A memory 112 and a subscriber identity module (SIM) card 146 may also be coupled to the digital signal processor 110. Further, as shown in FIG. 1, a digital camera 148 may be coupled to the digital signal processor 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

FIG. 1 also shows that the mobile device 100 may include a monitor module 114. The monitor module 114 communicates with multiple operational sensors distributed throughout the on-chip system 102 and with the digital signal processor 110 of the mobile device 100. As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the on-chip system 322. However, it should be understood that the monitor module 114 may also receive one or more indications or signals from one or more of these external devices by way of the analog signal processor 126 and the digital signal processor 110 to aid in the real time management of the resources operable on the mobile device 100.

In a particular aspect, one or more of the method steps described herein may implemented by executable instructions and parameters stored in the memory 112. These instructions may be executed by the digital signal processor 110, the analog signal processor 126, or another processor, to perform the methods described herein. Further, the processors, 110, 126, the memory 112, the instructions stored therein, or a combination thereof may serve as a means for performing one or more of the method steps described herein.

Figure 2:
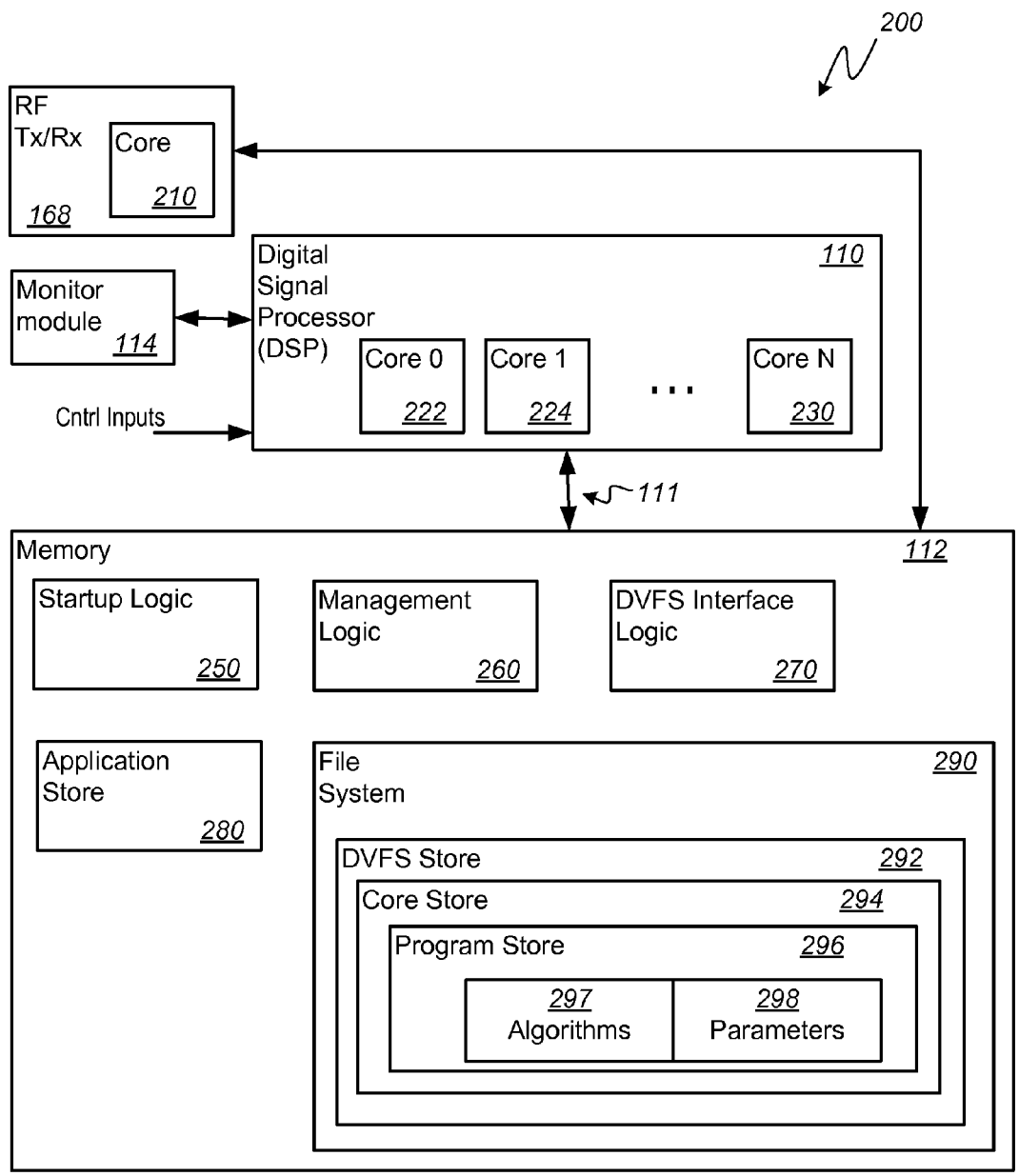
FIG. 2 is a schematic diagram illustrating features of the mobile device of FIG. 1.

FIG. 2 is a schematic diagram illustrating features of the mobile device 100 of FIG. 1. As indicated in FIG. 2, the digital signal processor 110 is coupled to the memory 112 via a bus 211. The digital signal processor 110 is a multiple-core processor having N core processors. That is, the digital signal processor 110 includes a first core 222, a second core 224, and a $N^{th}$ core 230. As is known, each of the first core 222, the second core 224 and the $N^{th}$ core 230 are available for supporting a dedicated application or program. Alternatively, one or more applications or programs can be distributed for processing across two or more of the available cores.

The first core 222, the second core 224 through to the Nth core 230 can be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

In the illustrated embodiment, the RF transceiver 268 is implemented via digital circuit elements and includes at least one processor such as the core processor 210 (labeled "Core"). In this digital implementation, the RF transceiver 268 is coupled to the memory 112 via bus 213.

Each of the bus 211 and the bus 213 may include multiple communication paths via one or more wired or wireless connections, as is known in the art. The bus 211 and the bus 213 may have additional elements, which are omitted for simplicity, such as controllers, buffers (caches), drivers, repeaters, and receivers, to enable communications. Further, the bus 211 and the bus 213 may include address, control, and/or data connections to enable appropriate communications among the aforementioned components.

When the logic used by the mobile device 100 is implemented in software, as is shown in FIG. 2, it should be noted that one or more of startup logic 250, management logic 260, DVFS interface logic 270, applications in application store 280 and portions of the file system 290 may be stored on any computer-readable medium for use by or in connection with any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the DVFS interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor and or the core 210 (or additional processor cores) in the RF transceiver 268.

The startup logic 250 includes one or more executable instructions for selectively identifying, loading, and executing a select program for managing or controlling the performance of one or more of the available cores such as the first core 222, the second core 224 through to the $N^{th}$ core 230. A select program can be found in the program store 296 of the embedded file system 290 and is defined by a specific combination of a performance scaling algorithm 297 and a set of parameters 298. The select program, when executed by one or more of the core processors in the digital signal processor and the core 210 in the RF transceiver 268, may operate in accordance with one or more signals provided by the monitor module 114 to scale the performance of the respective processor core. In this regard, the monitor module 114 may provide one or more indicators of events, processes, applications, resource status conditions, elapsed time, temperature, etc.

The management logic 260 includes one or more executable instructions for terminating an operative performance scaling program on one or more of the respective processor cores, as well as selectively identifying, loading, and executing a more suitable replacement program for managing or controlling the performance of one or more of the available cores. The management logic 260 is arranged to perform these functions at run time or while the mobile device is powered and in use by an operator of the device. A replacement program can be found in the program store 296 of the embedded file system 290 and is defined by a specific combination of a performance scaling algorithm 297 and a set of parameters 298. The replacement program, when executed by one or more of the core processors in the digital signal processor or the core 210 in the RF transceiver 268, may operate in accordance with one or more signals provided by the monitor module 114 or one or more signals provided on the respective control inputs of the various processor cores to scale the performance of the respective processor core. In this regard, the monitor module 114 may provide one or more indicators of events, processes, applications, resource status conditions, elapsed time, temperature, etc.

The DVFS interface logic or interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the mobile device 100 to suspend all performance scaling in the RF transceiver 268 when the received signal power falls below an identified threshold. By way of further example, the inputs may include a change to the management logic 260 that instructs the mobile device 100 to apply a desired program when the video codec 134 is active.

The interface logic 270 enables a manufacturer to controllably configure and adjust an end user's experience under defined operating conditions on the mobile device 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the mobile device 100 to search, locate, modify or replace the startup logic 250, the management logic 260, applications in the application store 280 and information in the embedded file system 290. The operator may use the resulting interface to make changes that will be implemented upon the next startup of the mobile device 100. Alternatively, the operator may use the resulting interface to make changes that are implemented during run time.

The embedded file system 290 includes a hierarchically arranged DVFS store 292. In this regard, the file system 290 may include a reserved section of its total file system capacity for the storage of information for the configuration and management of the various parameters 298 and performance scaling algorithms 297 used by the mobile device 100. As shown in FIG. 2, the DVFS store 292 includes a core store 294, which includes a program store 296, which includes one or more DVFS programs. Each program is defined as a combination of a respective performance scaling algorithm and a set of parameters associated with the specific algorithm. As a further example of the hierarchical nature of the DVFS store 292, a particular member of a set of files may be located and identified by the path of \startup\core0\algorithm\parameterset. In this example, a program is identified by the algorithm in combination with the contents of information stored in the parameter set. For example, a conventional DVFS algorithm known as "classic" may be identified to manage performance scaling on core0222 in accordance with the parameters sample rate, samples to increase, and samples to decrease as follows: \startup\core0\classic\SampleRate, with a value of 100, where the sample rate is in MHz; \startup\core0\classic\SamplesToIncrease, with a value of 2, where the samples to increase is an integer; and \startup\core0\classic\SamplesToDecrease, with a value of 1, where the samples to decrease is an integer. That is, the respective filenames define a parameter and the value of the parameter is identified by the contents of the file. The algorithm is defined by a periodic sampling of the CPU idle percentage and operates in accordance with a low threshold (% idle) and a high threshold (% idle). If a samples-to-increase threshold comparator indicates for 2 consecutive samples that performance should be increased, the DVFS algorithm increases performance in accordance with a predetermined clock level adjustment. Conversely, if a samples-to-decrease threshold comparator indicates for 1 consecutive sample that performance should be decreased, the DVFS algorithm decreases performance in accordance with the predetermined clock level (i.e., frequency) adjustment. As explained above, processor or core operating voltage may be changed together with changes in the clock frequency.

Alternatively, or additionally, the DVFS store 292 may be arranged such that the search path starts from the most specific with respect to its application (i.e., the processor core, algorithm, and parameter value) progresses to the least specific with respect to application. In an example embodiment, parameters are defined in the directories /core0, /coreAll and /default in association with the "classic" performance scaling algorithm. For example, the path \core0\classic\SampleRate—applies only to the classic algorithm operating on core0. This most specific application will override all others. The path \coreAll\classic\SampleRate—applies to any processor core running the classic algorithm. This application is not as specific as the example path above but is more specific than \default\classic\SampleRate—which applies to any processor core running the classic algorithm. This default application is the least specific and is used only if no other suitable path exists in the DVFS store 292. The first parameter found will be the one used. The \default location will always have a valid parameter file. The architecture of the individual cores, the architecture of the one or more shared caches and the mechanism(s) used to pass instructions between the cores, as well as the desired use cases for the mobile device 100 are expected to dictate the nature of the various performance scaling algorithms 297 stored in the memory 112.

Figure 3:
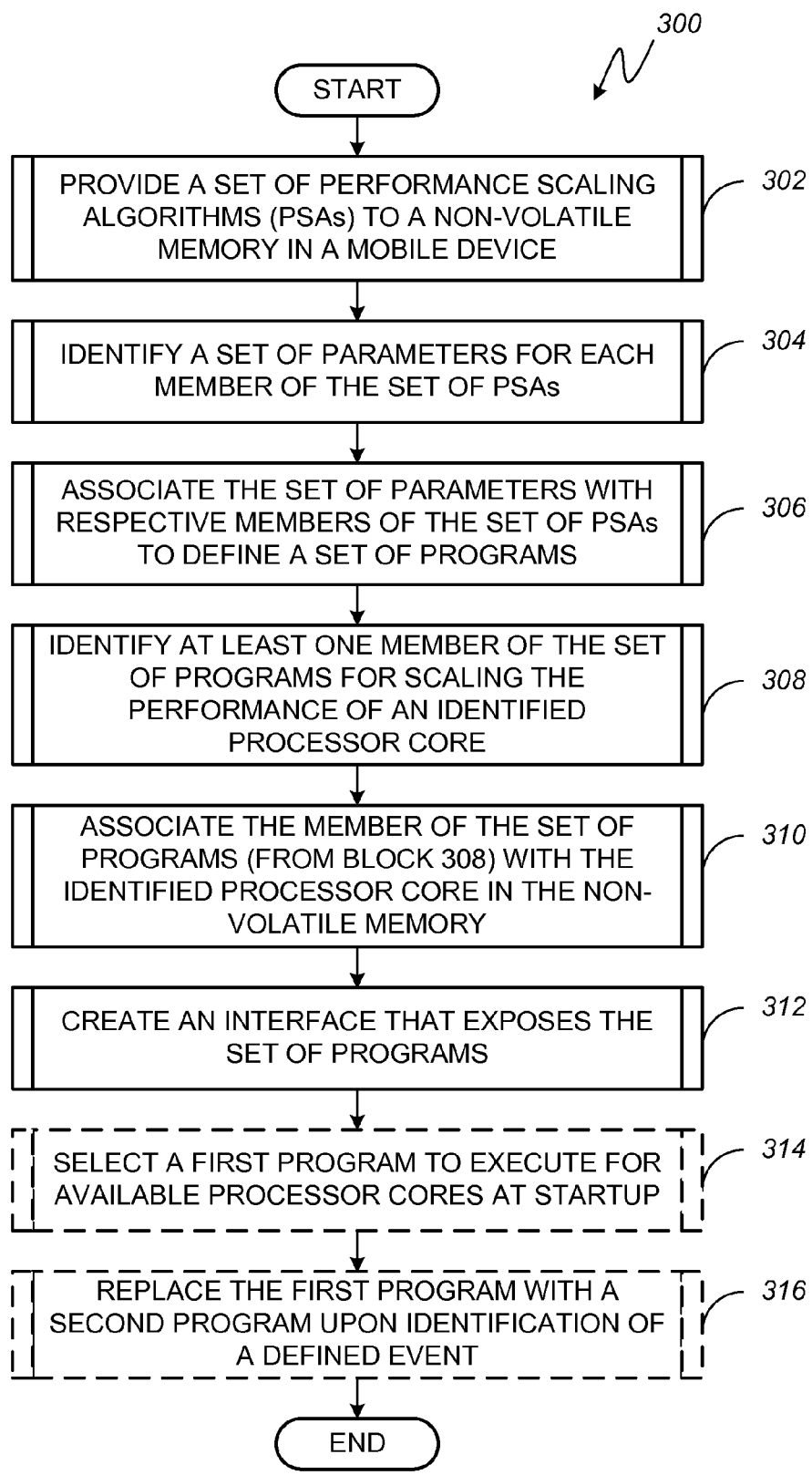
FIG. 3 is a flow chart illustrating an embodiment of a method for managing and exposing performance scaling algorithms operative on the mobile device of FIG. 1.

FIG. 3 is a flow chart illustrating an embodiment of a method 300 for managing and exposing performance scaling algorithms operative on the mobile device 100 of FIG. 1. The method 300 begins with block 302 where a set of performance scaling algorithms are provided in a non-volatile memory such as the memory 112 in the mobile device 100. In block 304, a set of parameters are identified for each member of the set of performance scaling algorithms. Thereafter, as indicated in block 306, the set of parameters are associated with respective members of the set of performance scaling algorithms to define a set of programs. As indicated above, this can be accomplished in a file system such as the file system 290 by establishing a defined sequence for organizing various parameters that can be applied with a specific performance scaling algorithm.

Next, as shown in block 308, at least one member of the set of programs is identified for scaling the performance of an identified processor core. In block 310, the identified processor core and the member of the set of programs identified in block 308 are associated with one another. As indicated above, this can be accomplished in a file system such as the file system 290 by storing or otherwise arranging algorithms and parameters hierarchically under a specified core identifier. In block 312, an interface that exposes the set of programs and the core associations is created. In optional block 314, a first program is selected for execution to implement performance scaling on the available processor cores at startup. This can be accomplished by a search routine that traverses the DVFS store 292 in an attempt to identify an appropriate DVFS program (i.e., a combination of a performance scaling algorithm and a set of parameters) for managing the operation of the respective processor core. Thereafter, as shown in optional block 316, the first program can be replaced during runtime with a second program upon identification of one or more of a defined event, an operating condition, a request for particular hardware resources, application(s), etc.

Figure 4:
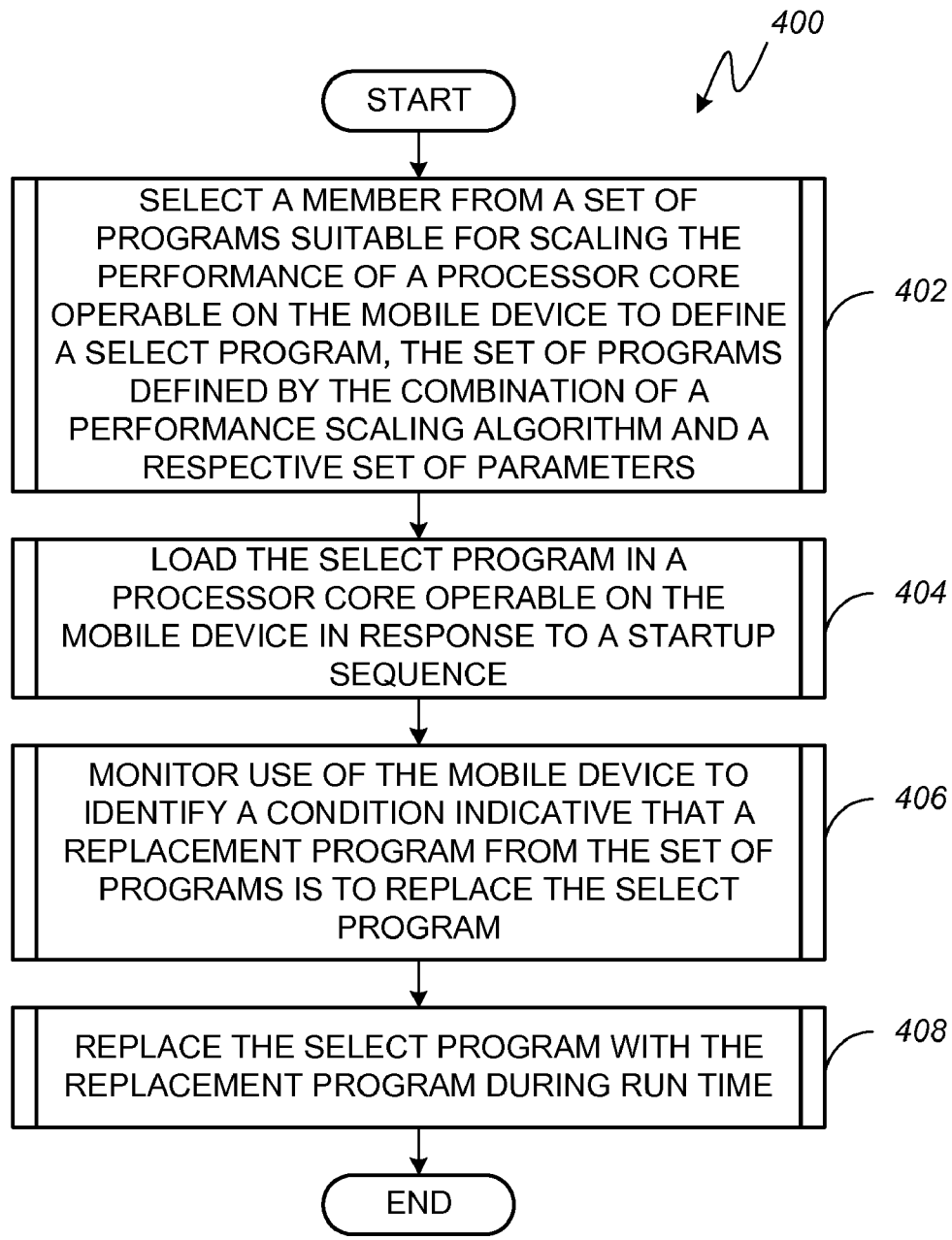
FIG. 4 is a flow chart illustrating an embodiment of a computer program product operable on the mobile device of FIG. 1.

FIG. 4 is a flow chart illustrating an embodiment of a computer program product operable on the mobile device of FIG. 1. The computer program product in some embodiments may encompass the functionality described above in association with the startup logic 250 and the management logic 260. Alternatively, the computer program product may further include aspects of the interface logic 270 and information suitable for populating the DVFS store 292 for a particular mobile device 100.

As illustrated in FIG. 4, example functionality of the computer program product is illustrated in the form of a flow diagram or method 400. The method 400 begins with block 402 where a member from a set of programs suitable for scaling the performance of a processor core operable on the mobile device 100 is selected to define a program. As further illustrated in block 402, the set of programs is defined by a respective combination of a performance scaling algorithm and a respective set of parameters that are applied with the algorithm. In block 404, the select program is loaded or otherwise communicated to a processor core on the mobile device 100. As indicated in block 404, this is accomplished in accordance with a startup sequence. One skilled in the art will understand that the startup sequence can be enabled in firmware, software or even the operating system itself. Once the select program is communicated to the respective processor core, the select program can be executed to scale the performance of the processor core or other processor cores operative on the mobile device 100 as may be desired.

Thereafter, as indicated in block 406, use of the mobile device 100 is monitored to identify a condition indicative that a replacement program from the set of programs is to replace the select program. In block 408, the select program is replaced by the replacement program during run time. As indicated above, the replacement of a select program with a replacement program can be accompanied with a managed termination of the select program before the replacement program is loaded and executed.

Having generally described an example embodiment of a mobile device 100 and how an embedded file system therein can be used to manage and expose the application of multiple performance scaling algorithms in association with the embodiments illustrated in FIGS. 1-4, reference is now made to FIGS. 5-8, which include additional embodiments to illustrate an offline process for optimizing the configuration of multiple performance scaling algorithms and operational parameters on a mobile device.

Figure 5:
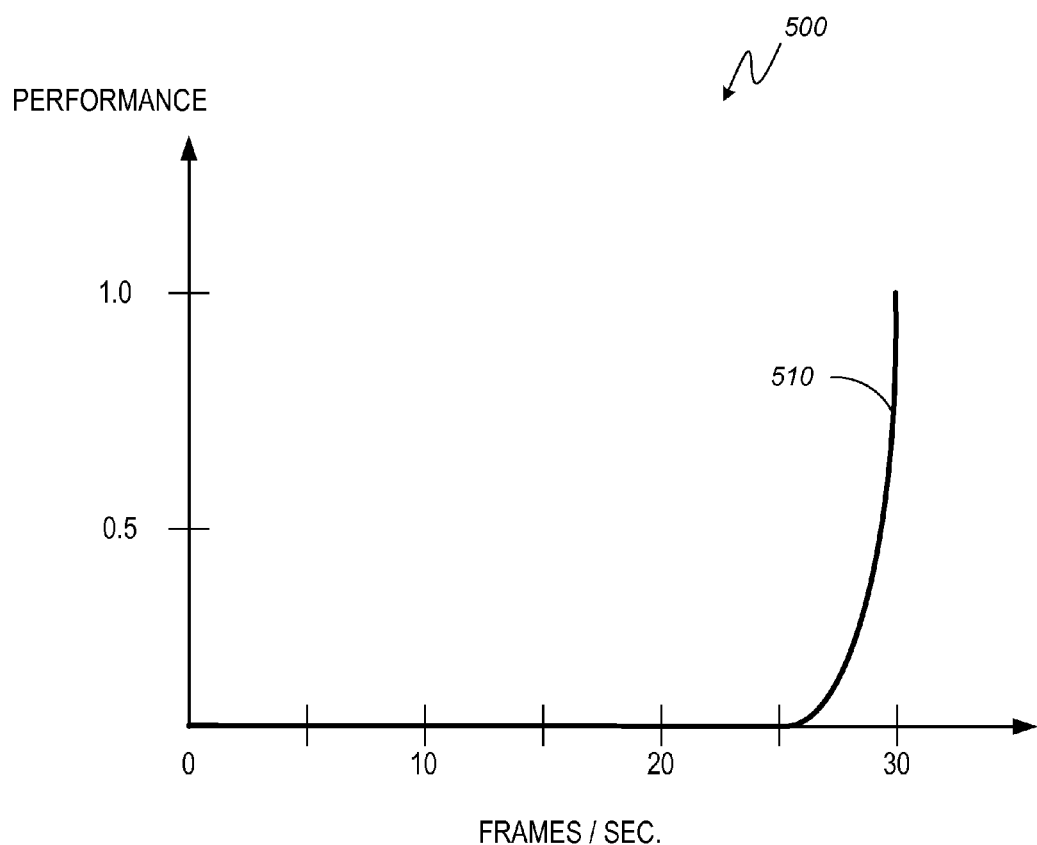
FIG. 5 is a plot illustrating an embodiment of a performance metric on the mobile device of FIG. 1.

In this regard, FIG. 5 is a plot illustrating the development of a performance metric on the mobile device of FIG. 1. The abscissa represents a number of frames of video information that are processed by the mobile device 100 each second. In this regard, the abscissa represents an actual performance of the mobile device 100, i.e., rendered frames of video information per second. The ordinate represents a normalized performance. Accordingly, the graph 500 illustrates the conversion or development of a performance metric from mobile device 100 performance. The trace 510 shows that a frame rate of about 26 frames per second or fewer is deemed unacceptable and receives a normalized performance score of 0. In contrast, a frame rate between about 26 frames per second and a nominal 30 frames per second is acceptable with the nominal frame rate of 30 frames per second receiving a normalized performance score of 1. Any number of factors associated with a select DVFS program (e.g., the algorithm, the specific value or values of one or more parameters) may have the potential for creating such an undesirable performance level. Furthermore, the shape of the trace 510 indicates that there is some range of operating voltages and frequencies that could be applied to one or more of the processor cores and/or a dedicated video codec on the mobile device 100 to achieve some power savings, while still achieving and/or maintaining an acceptable level of performance.

The plot in FIG. 5 is representative of one performance metric for a video playback feature. As the mobile device 100 is capable of executing numerous other applications, any number of additional performance metrics can be developed for comparing and analyzing the relative performance of other features or applications on the mobile device 100 as parameters are adjusted and performance scaling algorithms applied to one or more processor cores.

Figure 6A:
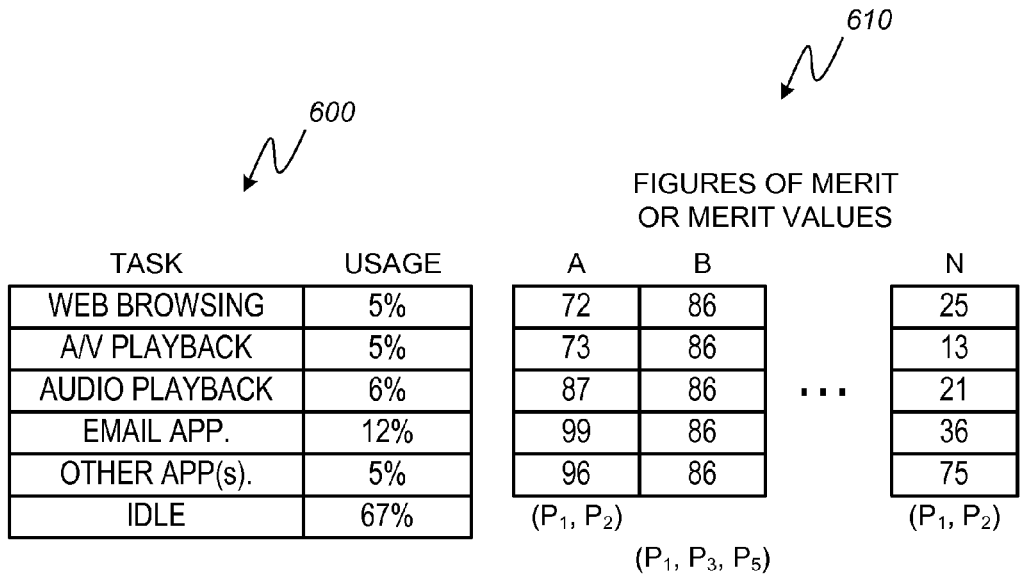
FIGS. 6A and 6B include schematic diagrams illustrating embodiments of use cases.
Figure 6B:
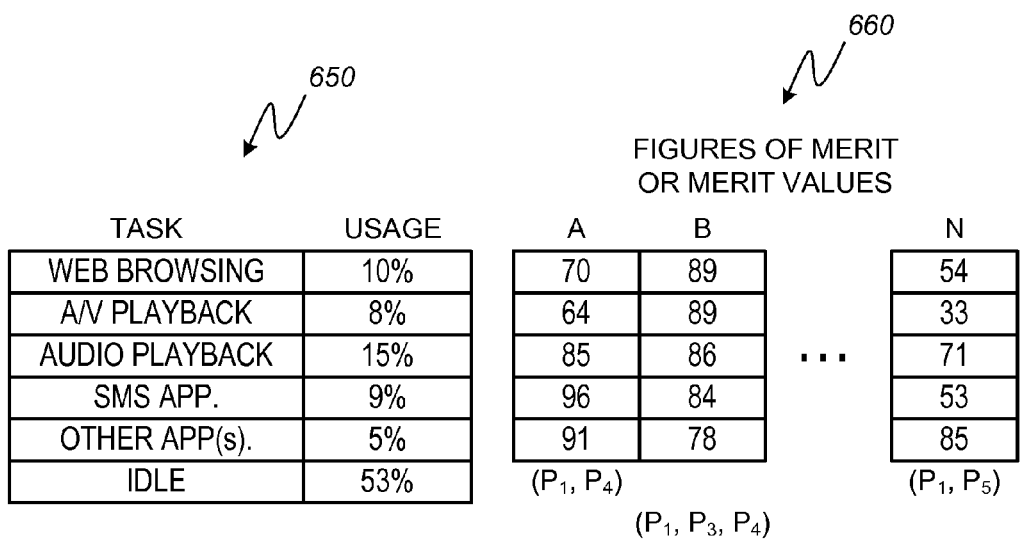

FIGS. 6A and 6B include schematic diagrams illustrating embodiments of use cases. A first example use case is illustrated in the table 600 of FIG. 6A. The use case includes a set of tasks that are capable of being performed on the mobile device 100. The tasks include web browsing (i.e., executing a browser application while the mobile device 100 is in communication range of transmitter that is coupled to the Internet), audio/video playback, audio playback, running an email application, and running one or more other applications. The use case is further defined by a projected usage of the mobile device 100. The projected usage is depicted as a percentage of the total time that the mobile device 100 is powered on and operating from a battery. The projected usage may be set by a manufacturer or seller of the mobile device.

A second example use case is illustrated in the table 650 of FIG. 6B. This second use case includes a short messaging service (SMS) application in place of the email application of the first use case. In addition to the change in the listed tasks to be performed on the mobile device 100, the second use case includes a distinct set of projected percentages that the end user of the device might be performing the associated task.

Accordingly, it is not a trivial matter to identify if one of the available combinations of performance scaling algorithms and parameters on the mobile device 100 is more effective at saving power for a projected use case. A figure of merit or a merit value provides a quantitative measure for comparing the application of N available performance scaling algorithms over M sets of possible parameter combinations against each of the tasks to be performed on the mobile device 100. The merit value is the product of a normalized performance metric and a corresponding power metric. As indicated above, one or more performance metrics can be identified for each task.

The power metric can include a saved power value or a total power used. The total power used may be a better indicator of the relative effectiveness of various performance scaling algorithms and parameters as total power expended by the mobile device 100 has both a static and a dynamic component. A function of the normalized performance metric and the power metric, namely the product of these values, is shown in the example table 610 (FIG. 6A) and the example table 660 (FIG. 6B). The values depicted in the table 610 and the table 660 are scaled or normalized on a scale of 0 to 100, with a scaled score or merit value of 0 indicating the most undesirable combination and a merit value of 100 representing the best possible performance and power savings for a given combination of performance scaling algorithm and parameter set. Although the table 610 and the table 660 include the same performance scaling algorithms (i.e., algorithm A, algorithm B, and Algorithm N), the corresponding merit values for each of the tasks in the respective use cases is different as the parameters applied is different for each use case.

The information in the example table 610 and the information in the example table 660 still do not readily indicate if a particular performance scaling algorithm will perform better across the entirety of the use case. However, a system or composite merit value (CMV) can be determined from the following equation $$CMV = \sum_{n}^{N} MV(\text{Algorithm, parameters}) \times w_n \quad \text{Equation 1}$$

where, n is the use case; and w is a weighting factor, which in the most basic embodiment can be the percentage of time that the mobile device 100 is expected to be performing one or more tasks. In alternative embodiments, the weighting factor could be a value indicative of a relative importance of any one use case in making a determination of a best combination of performance scaling algorithm and parameter set for a mobile device 100. Note that in some cases, a particular mobile device 100 can perform multiple tasks simultaneously. Thus, for each use case, a merit value (MV) can be calculated as the product of a performance metric and a power metric when the mobile device 100 is performing the designated task or tasks in accordance with a combination defined by a specific algorithm and a set of parameters. As will be explained below, a test system can step through any number of performance scaling algorithms and parameter sets of interest to determine if a particular combination is more desirable than the others.

A similar data collection procedure can be applied after a mobile device 100 has been delivered to a customer of the device. This would allow tuning and performance scaling algorithm selection to be determined as shown in FIGS. 6A and 6B, but for the actual customer usage rather than the projected usage for the mobile device 100. In addition, once it has been determined which performance scaling algorithm and parameter configuration results in the most power saved for a particular use case, the mobile device 100 can be configured to detect the use case and apply the performance scaling algorithm and parameter set when that use case is active.

Figure 7:
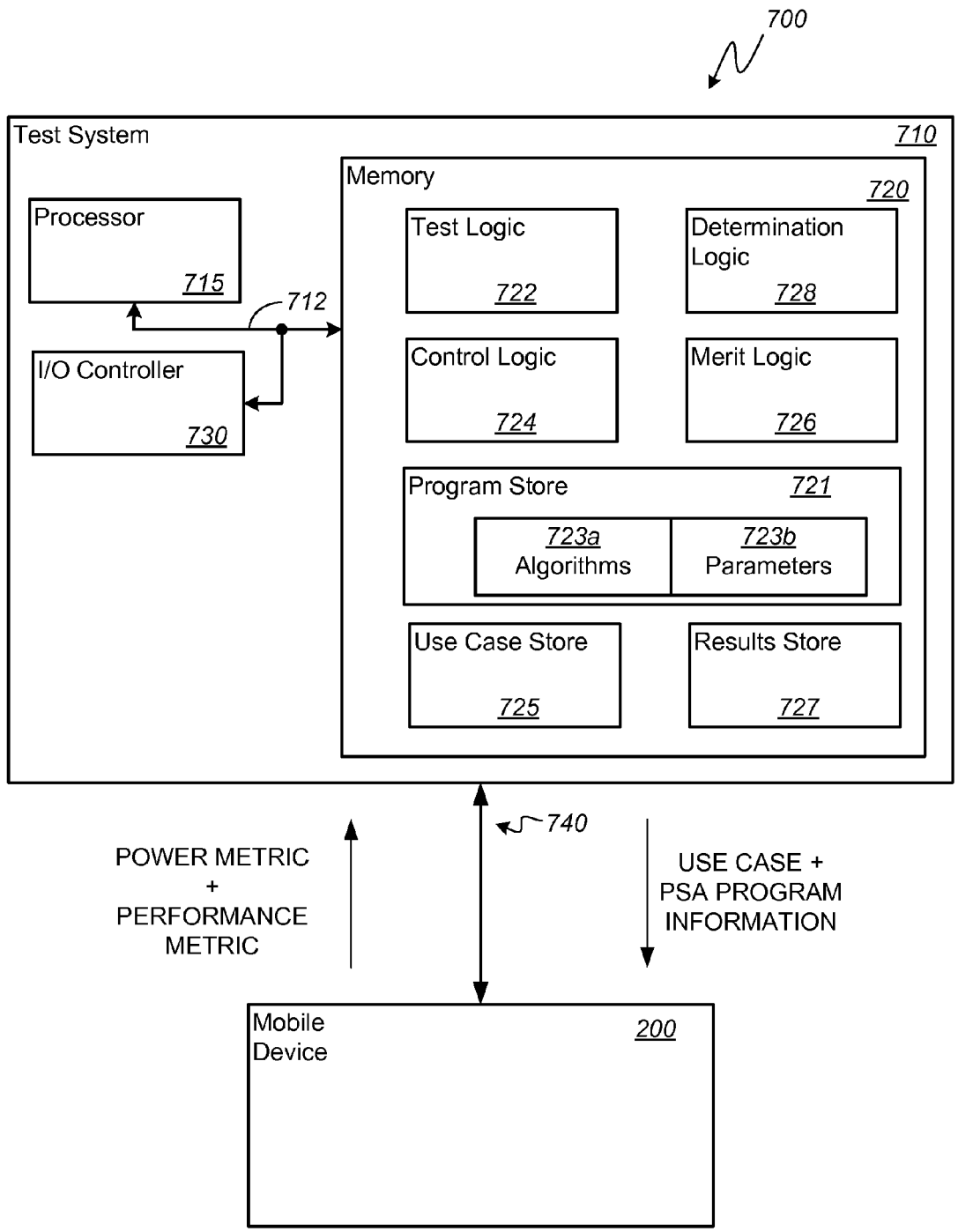
FIG. 7 is a schematic diagram illustrating an embodiment of a test environment.

FIG. 7 is a schematic diagram illustrating an embodiment of a test environment 700. The test environment 700 includes a test system 710, which is communicatively coupled via a communication link 740 with a mobile device under test (i.e., the mobile device 200). The communication link 740 can be a wired or wireless link. The test system 710 in the illustrated embodiment includes a processor 715, a memory 720 and an input/output controller 730 that are coupled to one another by a local bus 712. The local bus 712 may have additional elements, which are omitted for simplicity, such as controllers, buffers (caches), drivers, repeaters, and receivers, to enable communications. Further, the local 712 bus may include address, control, and/or data connections to enable appropriate communications among the aforementioned components.

The processor 715 is a hardware device for executing software (i.e., programs or sets of executable instructions), particularly that stored in memory accessible by the processor 715, such as the memory 720. The processor 715 can be any custom made or commercially available processor, a central processing unit (CPU), an auxiliary processor among several processors associated with the test system 710, a semiconductor based microprocessor (in the form of a microchip or chip set), or generally any device for executing instructions.

The input/output (I/O) controller 730 manages all information that is received by or communicated from the test system 710. The I/O controller 730 manages information transfers between any number of I/O device(s) including devices such as, for example but not limited to, a keyboard, a mouse, a scanner, a microphone, and/or a touch sensitive display, etc. The I/O device(s) also include one or more of a modem, a radio frequency (RF) or other transceiver, an Ethernet interface, a universal serial bus interface, etc.

The memory 720 can include any one or combination of volatile memory elements (e.g., random-access memory (RAM), such as dynamic random-access memory (DRAM), static random-access memory (SRAM), synchronous dynamic random-access memory (SDRAM), etc.) and non-volatile memory elements (e.g., read-only memory (ROM), hard drive, tape, compact disk read-only memory (CD-ROM), etc.). Moreover, the memory 720 may incorporate electronic, magnetic, optical, and/or other types of storage media. Note that the memory 720 can have a distributed architecture, where various components are situated remote from one another, but can be accessed by the processor 715.

The software in the memory 720 may include one or more separate programs or logic, each of which comprises an ordered listing of executable instructions for implementing various defined functions. In the example embodiment illustrated in FIG. 7, the software in the memory 720 includes the test logic 722, control logic 724, merit logic 726, and the determination logic 728. In alternative embodiments, one or more of the test logic 722, control logic 724, merit logic 726, and the determination logic 728. may be implemented via one or more distributed computing devices remote from but accessible to the test system 710.

When the logic used by the test system 710 is implemented in software, as is shown in FIG. 7, one or more of the test logic 722, control logic 724, merit logic 726, and the determination logic 728 may be stored on any computer-readable medium for use by or in connection with any computer-related system or method. In addition, information identifying performance scaling programs such as algorithms 723a and parameters 723b as stored in program store 721, use cases as stored in use case store 725 and merit values or other results as stored in results store 727 may also be stored on a computer-readable medium.

The test logic 722 includes executable instructions for managing the various steps and or tasks for preparing a set of conditions for determining a quantitative result from the mobile device 200. The test logic 722 works in conjunction with the control logic 724 to configure the mobile device 200. The control logic 724 sends commands via the I/O controller 730 and the communication link 740 that configure the mobile device to function in accordance with a defined combination of a performance scaling algorithm and a set of parameters. In addition, the control logic 724 sends commands via these same elements to configure the mobile device 200 to perform a specified task or tasks in accordance with a use case. The test logic 722 is configured to step through any number of desired use cases, algorithms and parameters. For each test case, the test system 710 receives a power metric and a performance metric from the mobile device 200. The merit logic 726 receives the power and performance metrics and calculates a merit value or figure of merit for each test case. In turn, the test logic 722 sends the merit value from the merit logic 726 to the results store 727. The results store 727 may include a table such as the example tables shown in FIG. 6A and FIG. 6B. After all desired test cases have been completed the test logic 722 directs the determination logic 728 to identify a best combination of a performance scaling algorithm and parameter set for each use case. The determination logic 728 may add one or more indicators to a table such as the example table shown in FIG. 6A to generate a performance scaling schedule which can be communicated in any number of formats to the mobile device 200.

Figure 8:
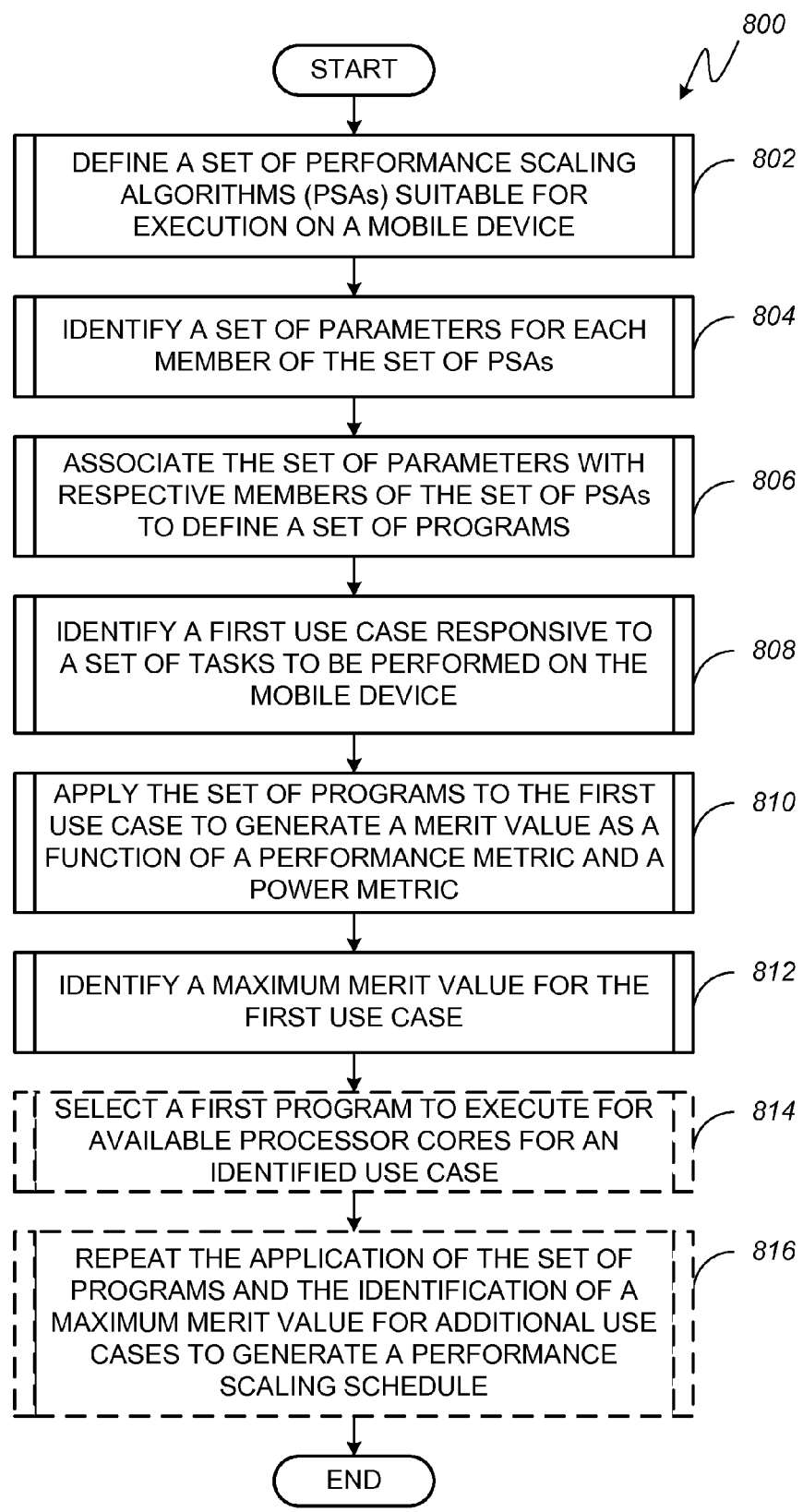
FIG. 8 is a flow chart illustrating an embodiment of a method for optimizing the configuration of a set of performance scaling algorithms operative on a mobile device.

FIG. 8 is a flow chart illustrating an embodiment of a method 800 for optimizing the configuration of a set of performance scaling algorithms operative on a mobile device such as the example mobile device 100 of FIG. 1. The method 800 begins with block 802 where a set of performance scaling algorithms suitable for execution on the mobile device 100 are defined. In block 804, a set of parameters for each member of the set of performance scaling algorithms is identified. Thereafter, as shown in block 806, the set of parameters are associated with respective members of the set of algorithms to define a set of programs. As indicated in block 808, a use case is identified responsive to a set of tasks that are designated to be performed on the mobile device 100. In block 810, the set of programs are iteratively applied to the mobile device as it is operating in accordance with the use case to generate a merit value. As further indicated in block 810, the merit value is a function of a performance metric and a power metric determined from operation of the mobile device 100 under the present use case and program. In block 812, a composite merit value is calculated for the tasks identified in the first use case. In block 814, a first or select program is identified as the most desirable for execution on available processor cores in the mobile device for an identified use case. Thereafter, as indicated in block 816, a test system 710 repeats the application of the set of programs and identifies a maximum merit value for additional use cases to generate a performance scaling schedule. Once determined, the performance scaling schedule can be communicated as a table or can be embedded in a file system such as the file system 290 to apply a select program to respective processor cores operative on the mobile device 100 as may be desired for identified use cases.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or in parallel (substantially simultaneously) with other steps without departing from the scope and spirit of the invention. In some instances, certain steps may be omitted or not performed without departing from the invention. Further, words such as "thereafter," "then," "next," etc., are not intended to limit the order of the steps. These words are simply used to guide the reader through the description of the exemplary method.

One of ordinary skill in the art of programming is able to write computer code or identify appropriate hardware to implement the disclosed processes without undue difficulty or experimentation. Therefore, disclosure of a particular set of executable instructions or detailed hardware devices is not considered necessary for an adequate understanding of how to make and use the invention. The inventive functionality of the claimed mobile device 100 and processes is explained in more detail in the above description and in conjunction with the Figures, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the scope of the present invention, as defined by the following claims.

What is claimed is:

1. A method for optimizing the configuration of a set of performance scaling algorithms on a mobile device, comprising:

defining a set of performance scaling algorithms suitable for execution on the mobile device;

identifying a set of parameters appropriate for each of the respective members of the set of performance scaling algorithms;

associating the set of parameters with the respective member of the set of performance scaling algorithms to define a set of programs;

identifying a first use case based on a set of tasks to be performed on the mobile device;
applying the set of programs iteratively to the mobile device when the mobile device is operating according to the first use case;
generating a set of merit values for each applied program, wherein each merit value is associated with a task of the first use case, and wherein generating each merit value comprises:
determining a performance metric and a power metric on the mobile device when performing the task; and
calculating a product of the determined performance metric and power metric; and
identifying a maximum merit value for the first use case.

2. The method of claim 1, further comprising:
selecting a first program to execute for the first use case as a function of the maximum merit value identified for the first use case.

3. The method of claim 1, further comprising:
identifying a subsequent use case different from the first use case; and
repeating the steps of applying the set of programs, generating a set of merit values for each of the applied programs, and identifying the maximum merit value for the subsequent use case.

4. The method of claim 3, further comprising:
storing an indication of a member of the set of programs responsible for the maximum merit value for each use case to generate a performance scaling schedule; and
storing the performance scaling schedule on the mobile device.

5. The method of claim 4, further comprising:
detecting when a particular use case is active on the mobile device; and
selectively applying a combination of performance scaling algorithm and a set of parameters on the mobile device.

6. The method of claim 1, wherein the mobile device comprises:
one of a cellular telephone, a pager, a personal digital assistant, a reader, a satellite phone, a navigation device, or a computer with a wireless connection.

7. A system for identifying an optimal configuration for a set of performance scaling algorithms designated for execution on a mobile device, comprising:
a non-volatile memory unit; and
a processor communicatively coupled to the non-volatile memory unit, wherein the processor is configured with software instructions to perform operations comprising:
defining a set of performance scaling algorithms suitable for execution on the mobile device;
identifying a set of parameters appropriate for each of the respective members of the set of performance scaling algorithms;
associating the set of parameters with the respective member of the set of performance scaling algorithms to define a set of programs, wherein the set of programs is stored in a program store of the non-volatile memory unit;
identifying, from a set of use cases, a first use case based on a set of tasks to be performed on the mobile device, wherein the set of use cases is stored in a use case store of the non-volatile memory unit;
applying the set of programs iteratively to the mobile device while the mobile device is operating according to the first use case;
generating a set of merit values for each program applied, wherein the set of merit values is stored in a merit value store of the non-volatile memory, wherein each merit value is associated with a task of the first use case, and wherein generating each merit value comprises:
determining a performance metric and a power metric on the mobile device when performing the associated task; and
calculating a product of the determined performance metric and power metric; and
identifying a maximum merit value for the first use case.

8. The system of claim 7, wherein the set of use cases stored in the use case store are defined by a seller of the mobile device.

9. The system of claim 7, wherein the processor is configured with software instructions to perform operations further comprising:
associating a select member of the set of programs for the set of use cases in the use case store.

10. A system for identifying an optimal configuration for a set of performance scaling algorithms operative on a mobile device, the system comprising:
means for defining a set of performance scaling algorithms suitable for execution on the mobile device;
means for identifying a set of parameters appropriate for each of the respective members of the set of performance scaling algorithms;
means for associating the set of parameters with the respective member of the set of performance scaling algorithms to define a set of programs;
means for identifying a first use case out of a set of use cases based on a set of tasks to be performed on the mobile device;
means for applying the set of programs iteratively to the mobile device while the mobile device is operating according to the first use case;
means for generating a set of merit values for each of the applied programs, wherein each merit value is associated with a task of the first use case, and wherein means for generating each merit value comprises:
means for determining a performance metric and a power metric on the mobile device when performing the associated task; and
means for calculating a product of the determined performance metric and power metric;
means for identifying, from the set of programs, a select program responsible for maximum merit values for the first use case to generate a point on a performance scaling schedule; and
means for communicating the performance scaling schedule to the mobile device.

11. The system of claim 10, wherein means for identifying the first use case comprises means for identifying the set of tasks to be performed on the mobile device as a percentage of time.

12. A non-transitory computer-readable medium having stored thereon processor-executable instructions configured to cause a processor of a mobile device to perform operations comprising:
defining a set of performance scaling algorithms suitable for execution on the mobile device;
identifying a set of parameters appropriate for each of the respective members of the set of performance scaling algorithms;
associating the set of parameters with the respective member of the set of performance scaling algorithms to define a set of programs;

identifying a first use case based on a set of tasks to be performed on the mobile device;

applying the set of programs iteratively to the mobile device when the mobile device is operating in accordance with the first use case;

generating a set of merit values for each applied program, wherein each merit value is associated with a task of the first use case, and wherein generating each merit values comprises:

determining a performance metric and a power metric when the mobile device is performing the task; and calculating a product of the determined performance metric and power metric;

identifying maximum merit values for the first use case;

generating a point on a performance scaling schedule based on the applied program that is responsible for the maximum merit values; and communicating the performance scaling schedule to the mobile device.

13. The non-transitory computer-readable medium of claim 12, wherein the stored processor-executable instructions are configured to cause a processor of the mobile device to perform operations further comprising:

identifying a second use case different from the first use case; and repeating operations of applying the set of programs, generating a set of merit values for each program applied, and identifying the maximum merit values for the second use case.

14. The non-transitory computer-readable medium of claim 12, wherein at least one of the set of performance scaling algorithms comprises a load-balancing algorithm suitable for controlling the execution of multiple processor cores.

15. The non-transitory computer-readable medium of claim 12, wherein identifying a first use case comprises identifying the set of tasks to be performed on the mobile device as a percentage of time.

16. A method for optimizing the configuration of a set of performance scaling algorithms operative on a mobile device, the method comprising:

storing a set of performance scaling algorithms suitable for execution on the mobile device;

associating a set of parameters appropriate for each of the respective members of the set of performance scaling algorithms with the respective member of the set of performance scaling algorithms to define a set of programs;

identifying a set of use cases based on a set of tasks to be performed on the mobile device;

applying the set of programs to the mobile device iteratively when the mobile device is operating according to each respective use case;

generating a set of merit values for each applied program, wherein each merit value is associated with a task of the respective use case, and wherein generating each merit value comprises:

determining a performance metric and a power metric when the mobile device is performing the task; and calculating a product of the determined performance metric and power metric;

storing an indication of a member of the set of programs responsible for maximum merit values for each use case to generate a performance scaling schedule;

storing the performance scaling schedule on the mobile device;

detecting when a particular use case is active on the mobile device; and selectively applying a combination of performance scaling algorithm and the set of parameters on the mobile device.

17. The method of claim 16, wherein the mobile device comprises:

one of a cellular telephone, a pager, a personal digital assistant, a reader, a satellite phone, a navigation device, or a computer.

18. The method of claim 1, further comprising:

generating a composite merit value for each applied program, wherein the composite merit value comprises a sum of the merit values associated with the tasks of the first use case;

identifying a maximum composite merit value for the first use case; and selecting a first program to execute for the first use case as a function of the maximum composite merit value identified for the first use case.

19. The system of claim 7, wherein the processor is configured with software instructions to perform operations further comprising:

generating a composite merit value for each program applied, wherein the composite merit value comprises a sum of the merit values associated with the tasks of the first use case;

identifying a maximum composite merit value for the first use case; and selecting a first program to execute for the first use case as a function of the maximum composite merit value identified for the first use case.

20. The system of claim 10, further comprising:

means for generating a composite merit value for each program applied, wherein the composite merit value comprises a sum of the merit values associated with the tasks of the first use case;

means for identifying a maximum composite merit value for the first use case; and means for selecting a first program to execute for the first use case as a function of the maximum composite merit value identified for the first use case.

21. The non-transitory computer-readable medium of claim 12, having stored thereon processor-executable instructions configured to cause a processor of the mobile device to perform operations further comprising:

generating a composite merit value for each program applied, wherein the composite merit value comprises a sum of the merit values associated with the tasks of the first use case;

identifying a maximum composite merit value for the first use case; and selecting a first program to execute for the first use case as a function of the maximum composite merit value identified for the first use case.

22. The method of claim 16, further comprising:

generating a composite merit value for each applied program, wherein the composite merit value comprises a sum of the merit values associated with the tasks of the first use case;

storing an indication of the member of the set of programs responsible for a maximum composite merit value for each use case to generate the performance scaling schedule.

* * * * *